(12) United States Patent
King et al.

(10) Patent No.: US 7,162,263 B2
(45) Date of Patent: *Jan. 9, 2007

(54) METHOD OF EDITING INFORMATION RELATED TO A PICTURE FILE DISPLAYED ON A CELLULAR TELEPHONE

(76) Inventors: John Joseph King, 1481 Cantigny Way, Wheaton, IL (US) 60187; Christina Judeen King, 1481 Cantigny Way, Wheaton, IL (US) 60187

( * ) Notice: Subject to any disclaimer, the term of this patent is extended or adjusted under 35 U.S.C. 154(b) by 403 days.

This patent is subject to a terminal disclaimer.

(21) Appl. No.: 10/307,121

(22) Filed: Nov. 29, 2002

(65) Prior Publication Data

US 2003/0083108 A1 May 1, 2003

Related U.S. Application Data

(63) Continuation of application No. 10/004,318, filed on Nov. 2, 2001.
(60) Provisional application No. 60/311,982, filed on Aug. 13, 2001, provisional application No. 60/246,773, filed on Nov. 8, 2000.

(51) Int. Cl.
*H04M 1/00* (2006.01)
*H04M 3/00* (2006.01)
*G06F 3/00* (2006.01)
*G06F 9/00* (2006.01)

(52) U.S. Cl. .................. 455/550; 455/566; 455/419; 455/432.3; 715/867; 715/864

(58) Field of Classification Search ............. 455/566, 455/556.1, 556.2, 557, 414.1, 433, 422.1, 455/426.1, 426.2, 461, 462, 465, 466, 414.2

See application file for complete search history.

(56) References Cited

U.S. PATENT DOCUMENTS

| | | | |
|---|---|---|---|
| 5,740,549 A | 4/1998 | Reilly | |
| 5,774,108 A | 6/1998 | Michiyoshi | |
| 5,809,415 A | 9/1998 | Rossman | |
| 5,870,683 A | 2/1999 | Wells | |
| 5,889,852 A | 3/1999 | Rosencrans | |
| 5,926,756 A * | 7/1999 | Piosenka et al. | ............ 455/418 |
| 5,928,325 A | 7/1999 | Shaughnessy | |
| 5,933,137 A | 8/1999 | Anderson | |
| 5,940,752 A | 8/1999 | Henrick | |
| 5,973,692 A * | 10/1999 | Knowlton et al. | .......... 715/835 |
| 6,138,036 A | 10/2000 | O'Cinneide | |
| 6,205,205 B1 | 3/2001 | Goldberg | |
| 6,205,321 B1 | 3/2001 | Rutledge | |
| 6,208,342 B1 | 3/2001 | Mugura | |

(Continued)

FOREIGN PATENT DOCUMENTS

JP 02089482 3/1990

(Continued)

OTHER PUBLICATIONS

Palm Power Review: Album-To-Go Software makes photo sharing a breeze, by Heather McDaniel. Nov. 1999.

(Continued)

*Primary Examiner*—Duc M. Nguyen

(57) ABSTRACT

A method of editing information related to a picture file displayed on a cellular telephone is disclosed. The method comprises the steps of enabling access to a plurality of picture files displayed on a cellular telephone from a location remote from the cellular telephone; enabling a user to edit information related to at least one picture file of the plurality of picture files at the location remote from the cellular telephone; and providing the edited information to the cellular telephone.

18 Claims, 7 Drawing Sheets

U.S. PATENT DOCUMENTS

| | | | |
|---|---|---|---|
| 6,208,659 B1 | 3/2001 | Govindarajan | |
| 6,266,690 B1 * | 7/2001 | Shankarappa et al. | 709/202 |
| 6,295,291 B1 | 9/2001 | Larkins | |
| 6,327,612 B1 | 12/2001 | Watanabe | |
| 6,351,523 B1 | 2/2002 | Detlaf | |
| 6,360,252 B1 | 3/2002 | Rudy | |
| 6,363,419 B1 | 3/2002 | Martin | |
| 6,415,164 B1 | 7/2002 | Blanchard | |
| 6,424,843 B1 | 7/2002 | Reitman | |
| 6,460,081 B1 | 10/2002 | Doherty | |
| 6,463,304 B1 | 10/2002 | Smethers | |
| 6,509,913 B1 | 1/2003 | Martin | |
| 6,542,812 B1 | 4/2003 | Obradovich | |
| 6,554,707 B1 | 4/2003 | Sinclair | |
| 6,567,671 B1 | 5/2003 | Amin | |
| 6,587,867 B1 | 7/2003 | Miller | |
| 6,633,759 B1 | 10/2003 | Koyabashi | |
| 6,674,439 B1 | 1/2004 | Shin et al. | |
| 6,687,382 B1 | 2/2004 | Nagahara et al. | |
| 6,724,403 B1 * | 4/2004 | Santoro et al. | 715/765 |
| 6,839,068 B1 | 1/2005 | Yoshioka | |

FOREIGN PATENT DOCUMENTS

| | | |
|---|---|---|
| JP | 020015688 | 6/2000 |
| WO | WO 97/33421 | 9/1997 |
| WO | WO 0025501 | 5/2000 |
| WO | WO 01/27831 | 4/2001 |
| WO | WO 01/52099 | 7/2001 |

OTHER PUBLICATIONS

O'Reilly Network: Digital Slide Shows on your Palm, by Derrick Story. Sep. 8, 2000.

Album ToGo :Viewing Pictures/Create Pictures, Sep. 2002.

Press Release: Qualcomm Unveils "pdQ" CDMA Digital Smartphone, Sep. 21, 1998.

pdQ Basics Handbook, Table of Contents/Ch. 5—Installing and Removing Applications (pp. 58-60), Unknown Publication Date.

Press Release: Ofoto Customers Add Creativity To Their Digital Photos With New Online Image Enhancement Features, Sep. 13, 2000.

Kodak DC290 Zoom Digital Camera User's Guide, Setting Review Mode Preferences, 1999.

Press Release: Club Photo Brings Color Photo Albums to New Palm IIIc Connected Organizers, Album To Go Extends New Color Capabilities for Business and Consumer Users, Feb. 22, 2000.

Handheld Media Articles: Palm Handheld Photo Viewers by Douglas Nixon (Apr. 2001).

Firepad Press Release: Firepad Releases First Photo-Sharing Technology for Palm OS Handhelds, Nov. 7, 2000.

Dream House Software Announces PocketPhoto™ Color, Mar. 16, 2000.

Image Expert CE: Sierra imaging's premier graphics program puts a digital photo album on any Windows Powered Handheld or Pocket PC, by Craig Peacock, Pocket PC Magazine, Jul. 2000.

First look at MS 'Stinger'—based Phone, by Richard Shim, ZDNet News, Aug. 8, 2000.

* cited by examiner

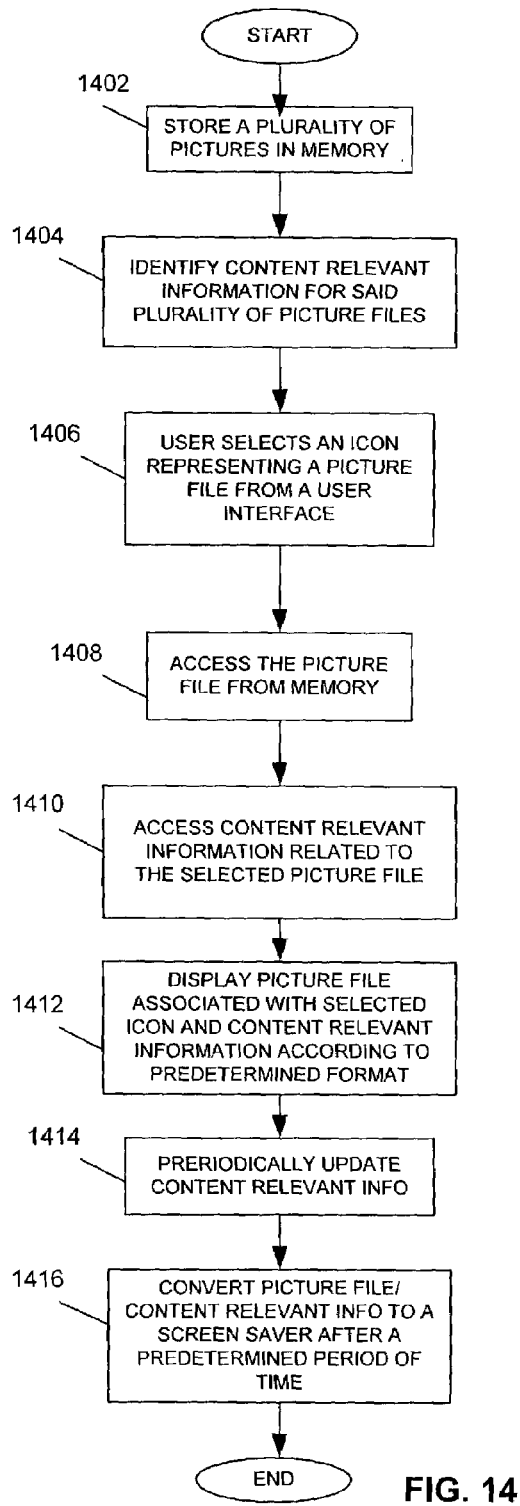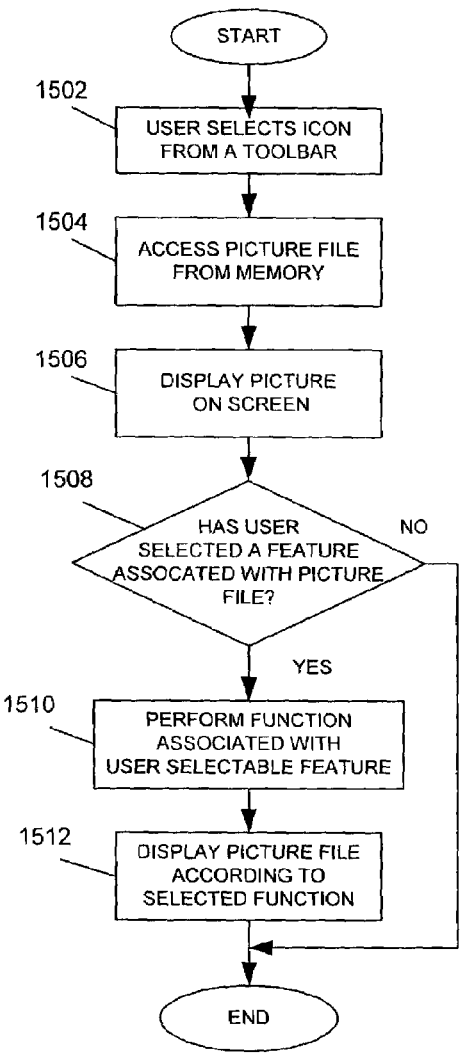
FIG. 14
FIG. 15

METHOD OF EDITING INFORMATION RELATED TO A PICTURE FILE DISPLAYED ON A CELLULAR TELEPHONE

RELATED APPLICATIONS

The present invention relates to U.S. application Ser. No. 10/307,175, entitled A Method of Enabling the Selection of a Picture File on a Cellular Telephone (LF104US), U.S. application Ser. No. 10/307,096, entitled A Method of Enabling the Display of a Plurality of Picture Files on a Cellular Telephone (LF105US), U.S. application Ser. No. 10/307,066, entitled A Method of Enabling the Display of a Picture File on a Cellular Telephone (LF106US), all filed on Nov. 29, 2002 by the same inventors as the present invention and assigned to the Assignee of the present invention.

CLAIM FOR PRIORITY

Applicants claim priority of U.S. application Ser. No. 60/246,773, filed on Nov. 8, 2000, U.S. application Ser. No. 60/311,982, filed on Aug. 13, 2001, and U.S. application Ser. No. 10/004,318, filed on Nov. 2, 2001, all filed by the same inventors as the present invention and assigned to the Assignee of the present invention, the entire applications of which are incorporated by reference.

FIELD OF THE INVENTION

This disclosure relates generally to the display of picture files, and more particularly to a method of enabling the display of a picture file on a cellular telephone.

BACKGROUND OF THE INVENTION

As individuals spend more time in front of their computers or other electronic devices having displays, individuals need additional features that personalize their devices and provide a diversion from their fast paced lives. Common sources of a diversion for individuals with access to computers include personal picture files and screen savers. While individuals may have personal picture files stored on or accessible from their computers, the personal picture files need to be accessed from a stored location or as an attachment to an email. There is currently no tool that enables a user to easily access personal picture files on such devices.

Similarly, screen savers can be entertaining and provide a diversion. However, some early conventional screen savers had limited utility. Accordingly, screen savers were developed for providing additional information with the content of the screen saver. With the increased access and popularity of the Internet, some screen savers were developed which provided current weather information with an outdoor scene associated with a particular city. The scene could change from a sunny morning, to a rainy afternoon, to a star-filled night. The screen saver could also be customized to display the temperature and weather forecast for a particular area by entering a zip code. The screen saver would also provide links to popular content areas of a weather web site. However, such screen savers were significantly limited a particular scene provided by the software or service provider.

Other screen savers were developed to provide more advanced information. Information "feeds" received from multiple information sources are aggregated, re-formatted and stored in a personalized real time information display system. When the display system receives a request from a user having a personal computer, the system was arranged to respond with information needed to display a screen saver that includes personalized, up-to-date information, such as traffic, weather and sports, that is of interest to that particular user. Each user had a personalized user profile indicating the categories or types of information that the user desires to receive, such as sports information, weather, investment advisories, and so on, and parameters that specify, for that user, the exact information desired to be received in each category. If the user's personal computer display had remained inactive for a predetermined period of time, the screen saver was activated, causing the personal computer to access the service node, and after interchange of prestored user identification and password data, retrieve information, obtained by the system from a variety of sources, based on the user's individual profile. The retrieved information is displayed on the screen without interrupting the screen saver function, and the displayed personalized data is thereafter updated in the same manner, at user-specified time intervals. While such screen saver systems are more advanced and provide additional personalized information beyond weather, such systems are limited in the display of the content and the user adaptability of the system.

Even more advanced systems were developed to provide user-selected content to a user on demand, and as a screen saver. In conventional information and advertising distribution system, a data server stores and updates a database of information items and advertisements. The information items and advertisements are each categorized so that each has an associated information category. Workstations remotely located from the data server each include a display device, a communication interface for receiving at least a subset of the information items and advertisements in the data server's database and local memory for storing the information items and advertisements received from the data server. An information administrator in each workstation establishes communication with the data server from time to time so as to update the information items and advertisements stored in local memory with at least a subset of the information items and advertisements stored by the data server. An information display controller in each workstation displays on the workstation's display device at least a subset of the information items and advertisements stored in local memory when the workstation meets predefined idleness criteria. At least a subset of the workstations includes a profiler for storing subscriber profile data. The subscriber profile data represents subscriber information viewing preferences, indicating information categories for which the subscriber does and does not want to view information items. The information display controller includes a filter for excluding from the information items displayed on the display device those information items inconsistent with the subscriber profile data. However, such systems provide information which is impersonal, and do not allow for personalization of content such as picture file content.

Accordingly, there is a need for a method and apparatus for providing content relevant information with a user's picture file for display of a user's device.

BRIEF DESCRIPTION OF THE DRAWINGS

FIG. 14 is a flow chart showing the method of displaying content relevant information according to predetermined formats in an alternate embodiment of the present invention;

FIG. 15 is a flow chart showing the method of displaying content relevant information according to user selectable features in an alternate embodiment of the present invention;

DETAILED DESCRIPTION

The present disclosure relates to providing content relevant information related to a picture file, and particular user interfaces for providing such information. In particular, the present disclosure relates to a method and apparatus for providing content relevant information associated with a picture file by displaying a user interface for accessing a plurality of picture files, coupling content relevant information to a selected picture file, and displaying the selected picture and the content relevant information on a display. The present disclosure further includes a method and for providing the content relevant information via a toolbar on a display, and more particularly providing a plurality of icons in the toolbar, coupling each icon to a picture file of a plurality of picture files, coupling content relevant information to a picture file, and displaying the picture file and the content relevant information. The disclosure further includes the use of a plurality of toolbars to display a picture file and content relevant information. In particular, a first toolbar having a plurality icons including an icon for selecting a second toolbar; and displaying the second toolbar having a plurality of icons representing picture files.

According to other aspects of Applicants' disclosure, a method and apparatus for displaying content relevant information associated with a picture file includes user input. In particular, a user interface for selecting a picture file and provides a user selectable option for displaying the picture file and the content specific information according to the user selectable option. Further, an entry window accessible by a user is disclosed for receiving information identifying the picture file and receiving content relevant information associated with the picture file, such as keywords or location information for enabling the display of content specific information associated with the information. The content specific information associated with the picture enables the display of relevant content information, such as an advertisement associated with the content of the picture file.

Figure 1:
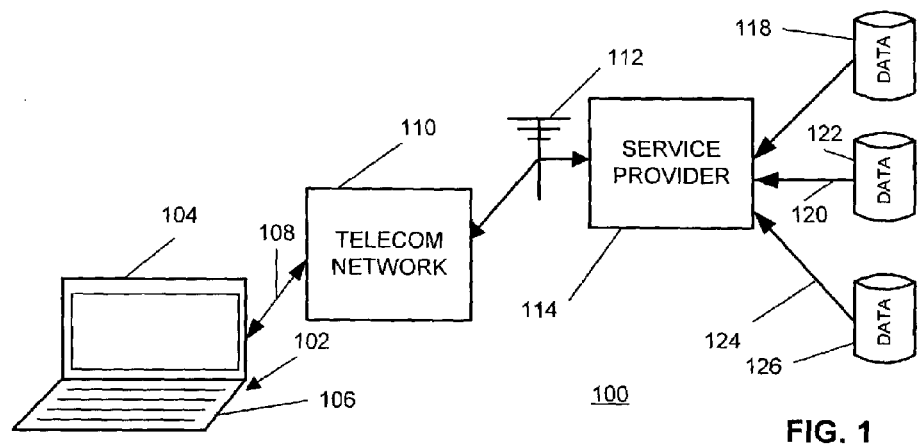
FIG. 1 is a system level diagram of a network for providing content specific information according to the present invention.

Turning now to FIG. 1, a system level diagram shows an exemplary network 100 for providing content relevant information with a picture file according to the present invention. Generally, a communication device 102, preferably having a display 104 and a keyboard 106, is coupled by a data connection 108 to a telecommunications network 110. Communication device 102 could be any electronic device having a display. Further, communication device 102 could be a "wired" device, such as a desktop computer, or could be a wireless device, such as a laptop computer, or a personal digital assistant (PDA) or cellular telephone. Similarly, data connection 108 could be any wired or wireless link which is well known in the art.

Telecommunications network 110 is coupled by another data connection 112 to a service provider 114 having access to a plurality of databases 116. The data connection 112 could for example be a wireline connection to a service provider, such as an Internet Service Provider (ISP), or the service provider could be associated with the telecommunications network. Alternatively, the databases could reside within the service provider or the telecommunications network. Although FIG. 1 represents one example of a network for implementing the system for providing content relevant information described in this specification, it should be understood that one skilled in the art could apply Applicant's invention to a variety of other suitable networks.

Figure 2:
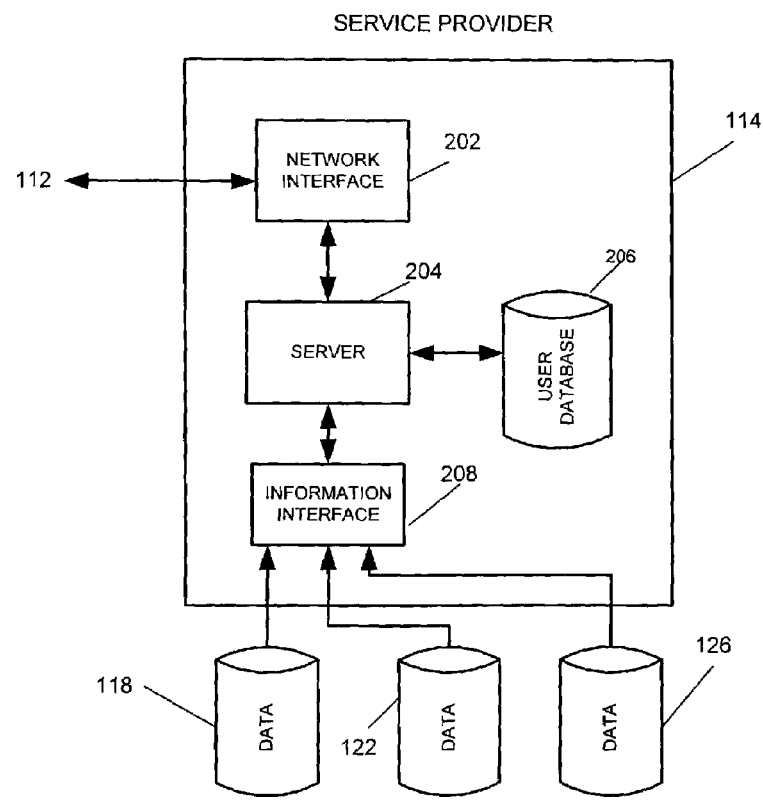
FIG. 2 is block diagram of a service provider interacting with a device according to the present invention.

Turning now to FIG. 2, an exemplary block diagram of service provider 114 according to the present invention is shown. Service provider 114 preferably includes a network interface 202 that receives requests from and transmits data to communication device 102 by way of data connection 112. The network interface provides a request to a server 204. Server 204 preferably has access to a user database 206, which database 206 could store picture files, content specific information associated with the picture files, user profiles, or other information that may be useful or necessary for providing content relevant information to an end user. For example, the user database could include statistical information in an end user's profile to help determine appropriate information, such as targeted advertisements, to provide to a user based upon content specific information related to a picture file.

An information interface 208 generally coordinates communications with databases 118–126 and provides information to server 204. The information interface could extract information, such as targeted advertisements from a variety of information providers, depending upon the end user's needs as set forth in the end user's profile. Alternatively, the functionality of information interface 208 could be incorporated in server 204. While the exemplary block diagram of service provide 114 shows one configuration of a service provider enabling the methods described in the present disclosure, other configurations of a service provider could be employed.

Figure 3:
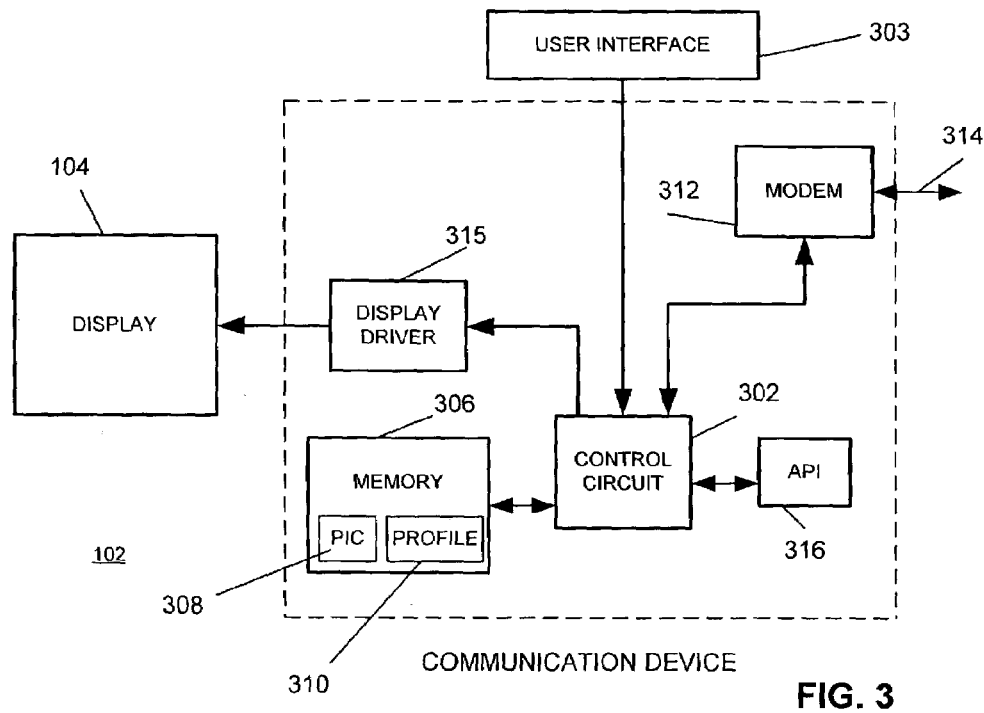
FIG. 3 is a block diagram of a display device according to the present invention.

Turning now to FIG. 3, a block diagram of a communication device 102 according to the present invention is shown. The device preferably includes a control circuit 302, such as a microprocessor, microcontroller, ASIC or some other circuit or integrated circuit to control the device. A memory device 306 could also be coupled to the control circuit to retain picture files 308 or user profile information 310. As discussed in reference to FIG. 2, such information could also be stored outside of the communication device (such as user database 206 shown in FIG.2) and provided to the device by a modem 312. Modem 312 transmits and receives information by of an I/O port 314, which could comprise a standard telephone jack, or could be some other suitable means such as infrared or some other wired or wireless protocol. A display driver 315 enables picture files and content specific information to be displayed on display 104. User interface 106 also enables a user to provide input to the control circuit necessary to access the Application Program Interfaces (APIs) 316 to display picture files and content specific information according to the present disclosure. The user interface also enables entry of data into the entry program described in FIGS. 8–10. Such APIs and other software necessary for requesting and receiving content specific information and display picture files with content specific information can be written in any suitable language, including but not limited to C++ or Java, or any 106 derivates thereof.

Figure 4:
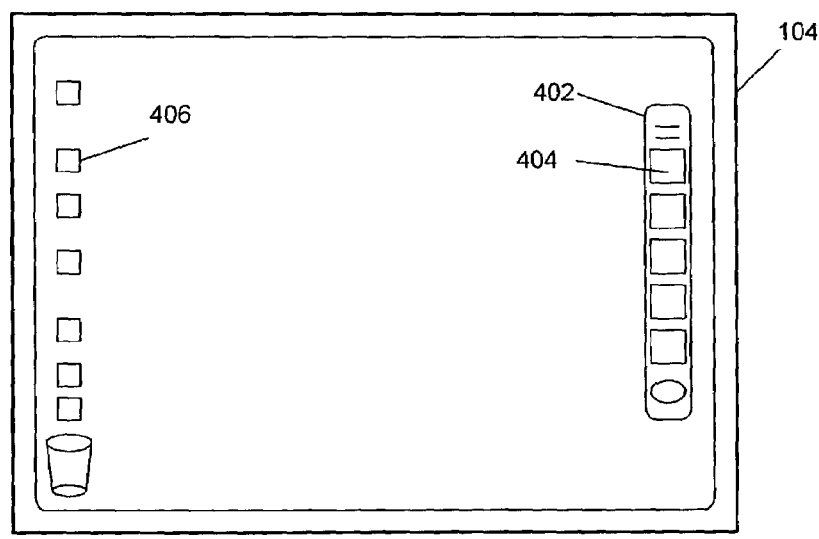
FIG. 4 is a plan view of a display showing a toolbar according to the present invention.

Turning now to FIG. 4, a plan view of a display showing a toolbar according to the present invention is shown. Display 104 preferably includes a toolbar 402 having a plurality of icons 404. Also shown are files or application programs residing on the desktop. An application icon 406 could reside on the desktop to access a program implementing the methods in the present disclosure. When the application program is opened, a user interface, such as toolbar 402 as shown will appear on the screen. The features of the icons on toolbar 402 will be described in more detail in reference to later figures.

Figure 5:
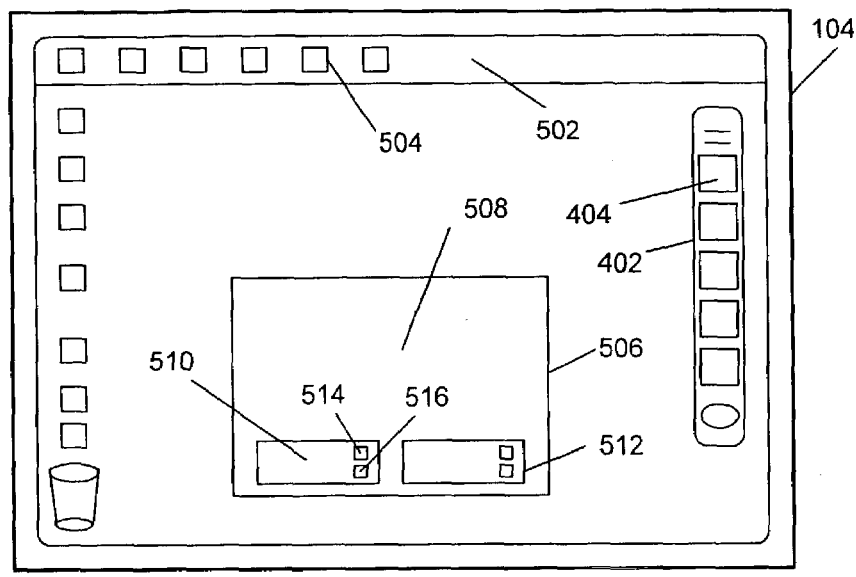
FIG. 5 is a plan view of an alternate embodiment of a display showing a plurality of toolbars according to the present invention.

Turning now to FIG. 5, a plan view of an alternate embodiment of a display shows a plurality of toolbars according to the present invention. In particular, a first toolbar 502 could include a picture icon 504 which, when selected by a user, could produce picture toolbar 402. Also shown is a window 506 which is generated when one of the picture icons of the plurality of picture icons is selected. As will be described in more detail in reference to later figures, window 506 could instead occupy the entire screen and/or function as a screen saver, either when an icon on toolbar 402 is initially selected or after a predetermined period of time. Window 506 could include an additional toolbar (not shown) for selecting or implementing certain features of the picture file in the window, such as a standard interface well known in the art for playing a streaming video related to the picture.

Also shown are information display areas 510 and 512. These display areas could include content relevant information associated with the content of the picture file. For example, information display area 510 could include the weather for the location of the content of the picture file, while information display area 512 could include a banner ad related to the content and/or location of the picture file. In addition, the banner ad could include options to access additional information regarding the content of the picture file or go to a particular website by selecting the banner ad. For example, a box 514 could be selected to enable a user to close out the information display area on the device. Alternatively, a box 516 could be selected to "save" the content of the information display area to a predetemined folder for easy access. Such a feature is particularly useful for a wireless device where the user interface or display may be less conducive to viewing a large amount of information. Preferably, the information in the information display would be saved to a user's website, which could be a personal website or a webpage for the user associated with the user's wireless service provider. Accordingly, a user could access information provided to the wireless device at a more convenient time or from a device with a more suitable user interface for reviewing the information.

Although two information display areas are shown, any number of information display areas could be employed. Further, the information display areas could display any type of information, and could be based upon any number of elements related to the picture file, alone or in combination, including but not limited to such elements as a keyword related to the content of the picture, the geographic location of the content of the picture file, the owner or originator of the picture file, etc.

Figure 6:
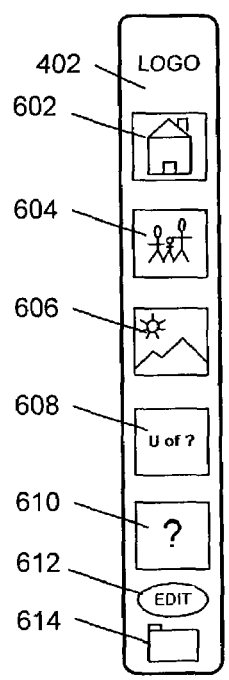
FIG. 6 is an enlarged view of a toolbar on the display of FIG. 4.

Turning now to FIG. 6, an enlarged view of an exemplary toolbar 402 is shown. Toolbar 402 includes a number of icons representing pictures files, which could be accessed by the user. The icons could be graphical representations of the content of the picture or could be a "thumbnail" of the actual picture file. For example, in the exemplary toolbar in FIG. 6, a house icon 602, a family icon 604, a vacation icon 606, an alumni icon 608, and a "mystery" icon 610 are shown. While particular icons are shown, it would be understood by one skilled in the art that any number of icons representing any types of picture could be incorporated in the toolbar. As well be described in references to the entry program of FIG. 8, standard icons could be accessed by the user, or a thumbnail of the picture could be generated to be displayed on the toolbar. An edit icon 612 could also be included to enable access to an entry program of the toolbar for editing the content of the toolbar by a user. Finally, a folder 614 could be included on the toolbar to make it easy to store picture files to be accessed by a user, as described in more detail in reference to FIG. 8.

The mystery icon could provide a location provided by a service provider and which might be of interest to a particular user. That is, a service provider could select (and periodically change) a picture which might be of interest based upon information in the user's profile. For example, if a user entered picture files that related to vacation spots, a service provider could provide a mystery picture of various vacation spots, including advertisement for lodging or hospitality near the vacation spot. Such network provided pictures create good opportunities for targeted advertisements enabling a service provider to generate revenue.

Similarly, the toolbar could be created by a particular entity for an end user and include icons associated with a particular category or entity. For example, a toolbar could specific to a particular company (e.g. hotel chain promoting vacation spots), university, profession, sport, team, nationality, etc. Alternatively, the toolbar could include four icons, one for each season of a particularly favorite screen saver, or twelve icons, one for each month. Such specific toolbars could be maintained or updated by the service provider, which would not only eliminate the need for an end user to maintain the toolbar, but would also provide a way to provide targeted content specific information such as advertisements to end users.

Figure 7:
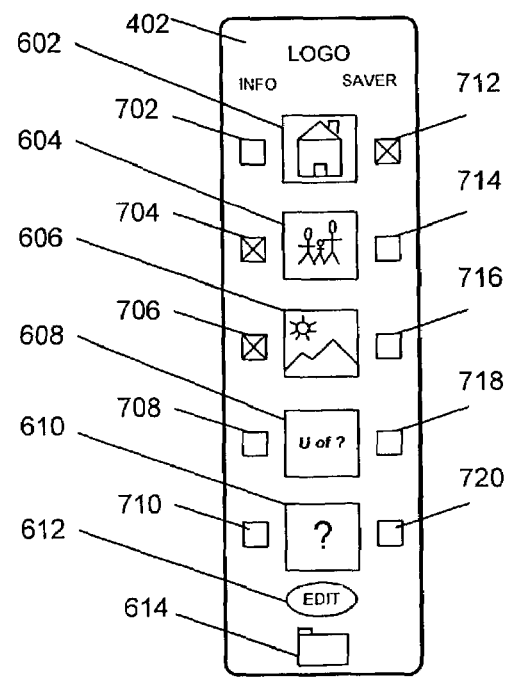
FIG. 7 is an alternate embodiment of a toolbar according to the present invention.

Turning now to FIG. 7, an alternate embodiment of a toolbar according to the present invention is shown. The alternate embodiment of the toolbar includes at least one information selection option button, and perhaps a plurality of such buttons. As shown in FIG. 7, information selection option buttons 702–712 associated with each icon on the left hand side of the icons could be selected for each icon to display certain information when the icon is selected. For example, weather or other content specific information such as advertisements could be displayed when the information selection option is selected and an icon is chosen. Family icon 604 and vacation icon 606 are shown with the information option selected in FIG. 7. Similarly, a second row of information selection option buttons 712–720 on the right hand side of the icons could be chosen for a second display option. For example, when a particular information selection option button in the second row is selected (such as house icon 602 in FIG. 7) the picture file associated with a particular icon will appear as a screen saver if the display device is inactive for a predetermined period of time. If a user does not select a particular feature before selecting an icon, the user would preferably have the option of later selecting the function after the picture file is displayed. In the event the screen saver option is later selected, the information would be shown, while the selected picture file would be displayed as a screen saver with other selected picture files after a predetermined period of time.

If a plurality of information selection option buttons enabling a screen saver function are selected, the screen saver will periodically cycle through the selected picture files. It is contemplated that user preferences related to the cycling of selected pictures could be selected by a user, for example by selecting the "OPTIONS" icon in FIG. 8. Although two rows of information selection option buttons are shown, other button configurations could be employed. For example, a single button could be chosen to apply a certain function to all icons. Alternatively, additional rows of information selection buttons could be employed for other functions, such as web-based links related to the content of the picture file.

Figure 8:
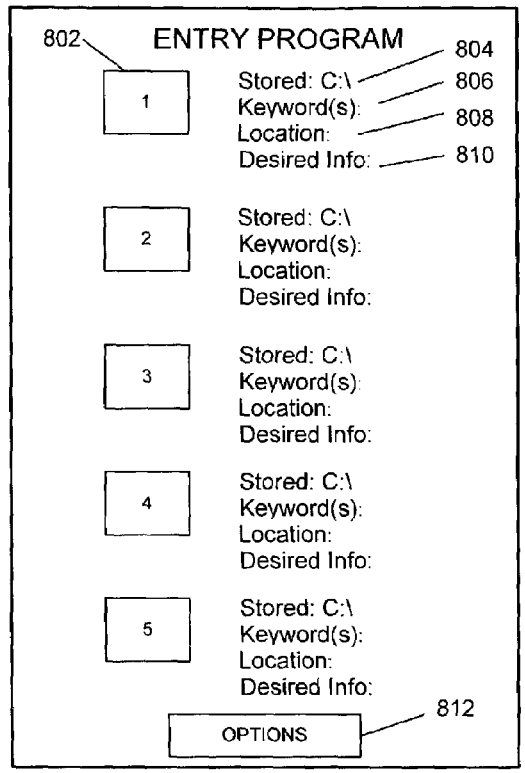
FIG. 8 is a screen for entering information associated with a picture file according to the present invention.

Turning now to FIG. 8, an entry program accessed by edit icon 612 for entering data associated with a picture file according to the present disclosure is shown. When the entry program is accessed, a plurality of icons 802 (numbered 1–5) associated with the picture files are shown. Next to each numbered icon is a data block having a variety of fields for entering information related to the content of the picture file. A first data field 804 could include the storage location of the picture file. As described earlier, this location could be local to the device or could be associated with a remote or service provider network. The storage location field could be established so that an end user would merely need to enter the name of the picture file (e.g. the portion of the file name before ".gif" for a GIF file). Preferably, the picture file would be stored in a predetermined folder, such as a folder 614 on the user interface. That is, a "shortcut" could be created on the user interface such that a user could merely "drag" a picture file onto the file in the user interface to store the picture file in the correct location.

Content specific information related to the picture could then be entered in the next two fields. For example, a second data field 806 could be a keyword representing the content of the picture file, such as home, vacation, dog, etc. A third data field 808 could include location specific information related to the content of the picture file, such as a zip code or other location information. Optionally, a user could have the option of selecting the type of content relevant information desired to be displayed, such as weather or news. Although a user may be able to select certain desired information, the user may automatically receive other content relevant information, such as advertisements. The information entered in the keyword, location or info desired fields could be entered manually or selected from a pull-down menu option. Alternatively, the entry program could be accessed remotely from the device. For example, a user could access the entry program from a home computer by accessing a website for the service provider to enter information related to the device. Such remote access to the entry program can be particularly beneficial for a device having a limited user interface, such as a cellular telephone.

Although only four data fields are shown, any number of data fields could be included. For example, multiple key words and/or locations could be entered. Similarly, a keyword and sub-category approach could be employed, to receive the desired content specific information. For example, a user could use a keyword "Pet" and sub-category "Dog," or use a keyword "Dog" and sub-category "Labrador" to receive the desired content specific information. Also, the device could automatically provide information related to the location of the device itself. For example, a GPS circuit could be coupled to control circuit 302 or a service provider through triangulation could provide information related to the location of the device. Such geographic location information of the device itself could be another factor in providing appropriate information or targeted advertisement to a user of a device.

Alternatively, a service provider could consider the standard icon selected by the use to represent a picture file in determining the appropriate content relevant information to be provided with the picture file. While certain data fields are used, a user need not enter information in every data field. Content relevant information provided for display could be provided based upon the information entered. Alternatively, the program could be written such that a picture will only be displayed if all the information is entered, enabling a service provider to provide the most relevant information to a user. Such completeness could be important to a service provider transmitting targeted advertisements.

Figure 9:
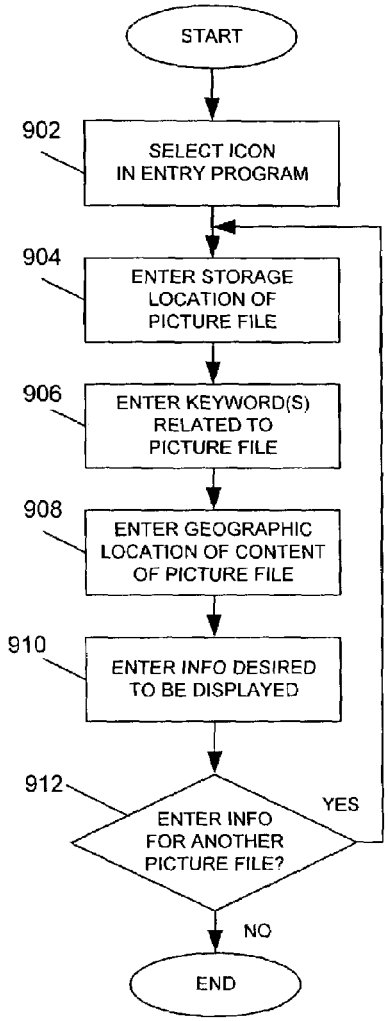
FIG. 9 a flow chart showing the operation of the screen for entering information of FIG. 6.

Turning now to FIG. 9, a flow chart shows the operation of the entry program of FIG. 8. A user wishing to enter information related to a particular picture file would select an icon (for example by double clicking on the icon) at a step 902. Initially, the icons would be numbered, but would preferably be replaced with a "thumbnail" of the picture file after the location information in first data field 804 related to the storage location of the picture file is entered at a step 904. Preferably, the order that icons appear on the toolbar could be changed for example by selecting "option" button 812. Content specific information could be entered in the following two steps. A user could enter keywords related to the content of the picture file at a step 906. A user could also enter location specific information related to the geographic location of the content of the picture file a step 908. Preferably, a user could then select the type of information which it desires to be displayed at a step 910. For example, it may choose weather, history, points of interest, news, facts, or trivia related to the content or location of the content of the picture files. The user could then determine whether to enter information for another picture at a step 912.

Figure 10:
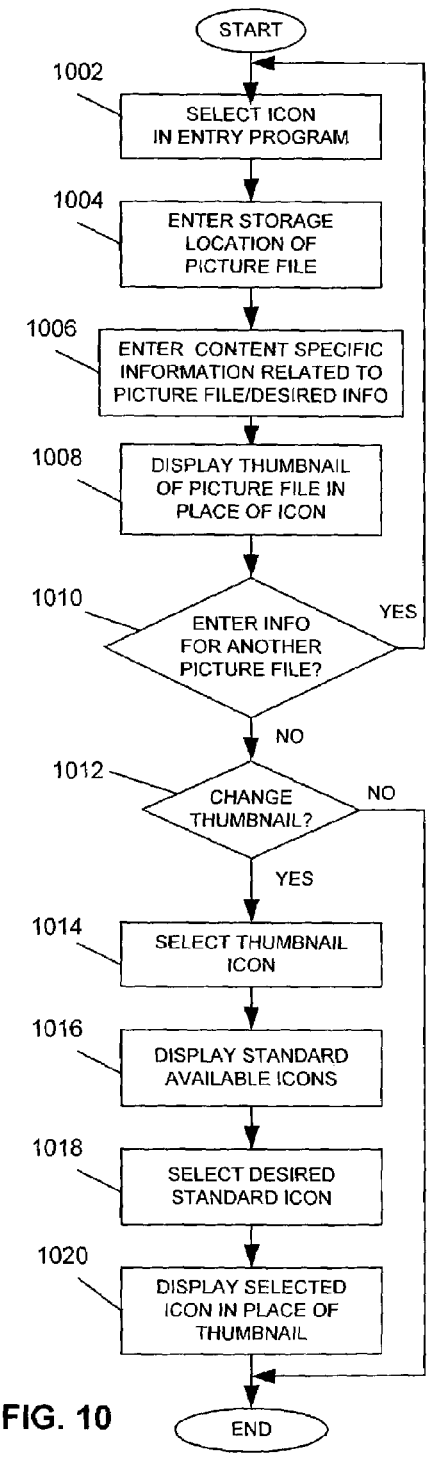
FIG. 10 is a flow chart showing an alternate embodiment of the flow chart showing the operation of the screen for entering information of FIG. 6.

Turning now to FIG. 10, a flow chart shows an alternate embodiment for entering and/or changing information by way of the entry program of FIG. 8. A user wishing to enter information related to a particular picture file would select an icon number (or thumbnail) at a step 1002, and would then enter the storage location of the picture file at a step 1006. The user would enter content specific information such as keywords or location information in data field at a step 1004. A thumbnail of the picture file would then be displayed at a step 1008. If information for additional picture files were to be entered at a step 1010, another icon would then be selected. If not, the user would then have the option of changing an icon related to a particular picture at a step 1012. When a thumbnail is selected, for example by double clicking at a step 1014, standard icons are displayed at a step 1016. A standard icon can then be selected to replace the thumbnail of the picture file at a step 1018, which could be displayed at a step 1020.

Figure 11:
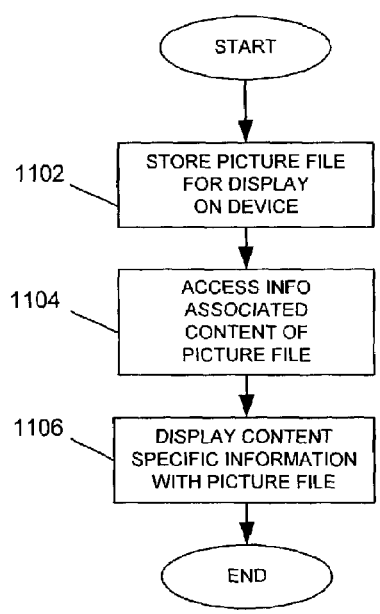
FIG. 11 is a flow chart showing the method of displaying content relevant information according to the present invention.

Turning now to FIG. 11, a flow chart shows the method of displaying content relevant information according to the present invention. In particular, a picture is stored at a step 1102. The picture file could be stored within the device or on a separate device or network, or with a service provider. The device then accesses information associated with the content of the picture file at a step 1104 in response to a selection by an end user. The content relevant information and the picture file are then displayed at a step 1106.

Figure 12:
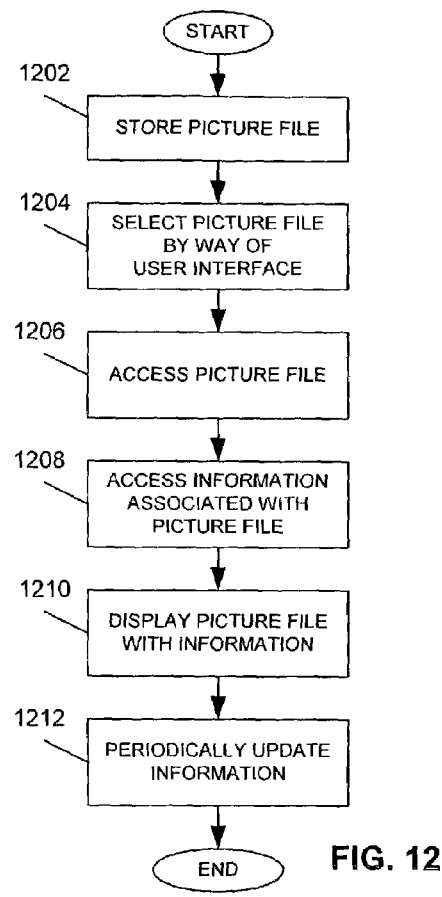
FIG. 12 is a flow chart showing the method of displaying content relevant information according to an alternate embodiment of the present invention.

Turning now to FIG. 12, a flow chart shows the method of displaying content relevant information according to an alternate embodiment of the present invention. In particular, a picture file is stored in memory at a step 1202. A user the selects a picture file from a user interface at a step 1204. The user interface could be for example toolbar 402 shown in FIG. 4 or some other suitable interface. The picture file is then accessed from a memory at a step 1206. The picture file could be stored in a memory on the device or on a separate network accessible by the device. The device then accesses content relevant information associated with the picture file at a step 1208. The content relevant information could be downloaded from a database accessible by the Internet, or could reside within the display device related to the picture file, and is preferably based on content specific information. The picture file and the content relevant information are then displayed at a step 1210. Preferably, the content relevant information is periodically updated at a step 1212.

Figure 13:
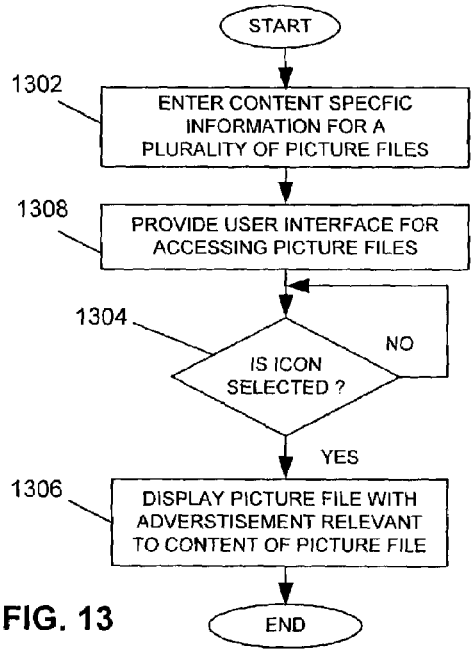
FIG. 13 is a flow chart showing the method of displaying content relevant information comprising advertisements according to an alternate embodiment of the present invention.

Turning now to FIG. 13, a flow chart showing the method of displaying content relevant information comprising advertisements according to the present invention. Content specific information such as keywords or geographic locations associated with picture files is entered at a step 1302. A user interface for accessing pictures then provided at a step 1304. It is then determined whether an icon for a picture file is selected at a step 1306. If an icon is selected, the picture is displayed with an advertisement related to the content of the picture at a step 1708.

Turning now to FIG. 14, a flow chart shows a method of displaying content relevant information according to predetermined formats. A plurality of picture files are stored in memory at a step 1402. Content relevant information for the plurality of picture files is then stored at a step 1404. These steps of storing could be performed by an end user or a third party, either on the display device or on a separate network. The user then selects an icon representing a particular picture file from a user interface at a step 1406. A picture file is then accessed from memory at a step 1408. Content relevant information associated with the selected picture file is then accessed at a step 1410. The content relevant information is preferably based upon content specific information associated with the selected picture file.

The picture file associated with the selected icon and the content relevant information is displayed according to a predetermined format at a step 1412. The predetermined format could either be a default format when the program is installed, or could include advanced features as described in more detail in reference to other figures. The content relevant information is periodically updated at a step 1414. The updates could be performed for a particular picture file whenever an icon is selected, or on a periodic basis for all picture files. A picture file, which may at first be displayed as a "window" on the display, could then be displayed as a screen saver after a predetermined period of inactivity. According to an alternate embodiment of the invention, information selection option buttons associated with each icon, such as buttons 714–722, could be selected to enable periodically rotating the pictures when in a screen saver mode. Alternatively, a default condition or a single button selected by an end user could enable the pictures to be periodically rotated during screen saver mode.

Turning now to FIG. 15 a flow chart shows the method of displaying content relevant information according to user selectable features. In particular, a user selects a picture icon from an icon toolbar at a step 1502. The picture file associated with the icon is accessed from memory at a step 1504. The picture file is then displayed on the screen at a step 1506. It is then determined whether the user has selected a user selectable feature at a step 1508. The function associated with the user selectable feature is then performed at a step 1510 and displayed at a step 1512. Such user selectable features could include information display, advertisement display, screen saver mode, etc.

Figure 16:
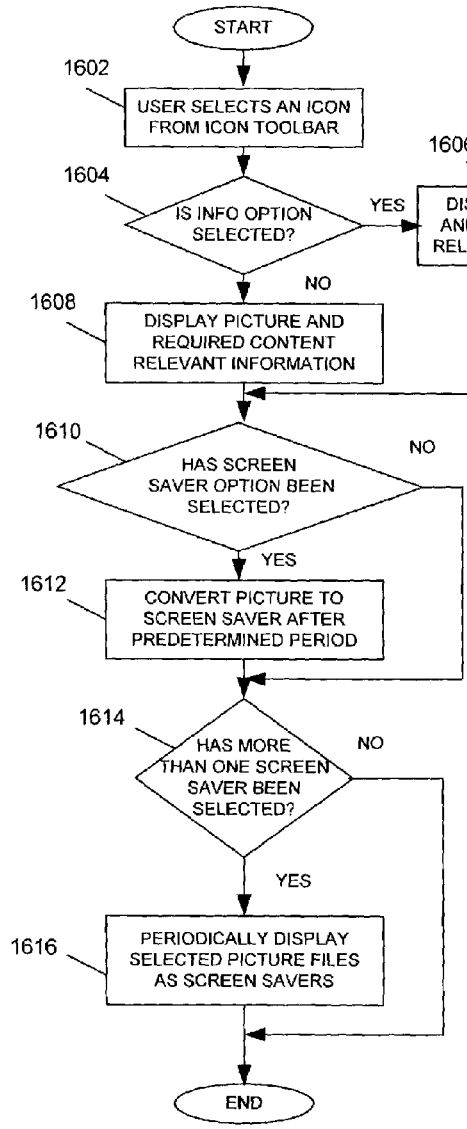
FIG. 16 is a flow chart showing the method of displaying content relevant information as a screen saver according to an alternate embodiment of the present invention.

Turning now to FIG. 16 a flow chart showing the method of displaying content relevant information as a screen saver according to an alternate embodiment of the present invention. A user selects a picture icon from an icon toolbar at a step 1602. It is then determined whether an information option is selected at a step 1604. If the information option is selected, the picture is displayed with information associated with the picture file at a step 1606. If the information option is not selected, the picture is displayed at a step 1608. It is then determined if a screen saver option is selected at a step 1610. If a screen saver option is selected, the window displaying the picture is converted to a screen saver after a predetermined period of time. It is then determined if more that one screen saver is selected at a step 1514. If all or a number of pictures are selected for a screen saver option, the pictures will be periodically rotated as screen savers. If the screen saver option is selected for only one picture, the picture is displayed as a screen saver at a step 1618.

Figure 17:
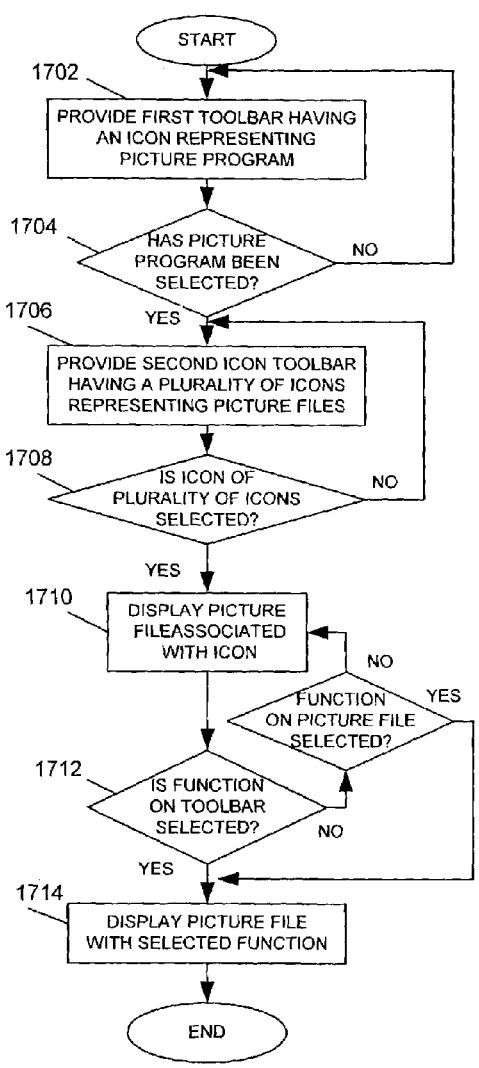
FIG. 17 is a flow chart showing the method of displaying content relevant information through a user interface having multiple toolbars according to an alternate embodiment of the present invention.

Finally, turning to FIG. 17, a flow chart showing the method of displaying content relevant information through a user interface having multiple toolbars according to an alternate embodiment of the present invention. A first toolbar having an icon denoting a picture program is provided on a display at a step 1702. It is then determined whether the picture program has been selected at a step 1704. If the program is selected, then a second toolbar having a plurality of icons representing picture files is then displayed at a step 1706. It is then determined if an icon on the second toolbar is selected at a step 1708. If an icon is selected, then the picture file will be displayed at a step 1710. It is then determined whether a particular function of the toolbar is selected at a step 1712. If a particular function is selected, then the picture will be displayed with the particular function at a step 1714.

In summary, the present disclosure relates to providing content relevant information related to a picture file, and particular user interfaces for providing such information. The foregoing discussion of the invention has been presented for purpose of illustration and description. Further, the description is not to limit the invention to the form disclosed herein. Consequently, variations and modifications commensurate with the above teachings within the skill and knowledge of the relevant art, are within the scope of the present invention. The embodiments discussed hereinabove are further intended to explain the best mode known of the invention and to enable others skilled in the art to utilize the invention in such, or in other, embodiments and with the various modification required by their application or uses of the invention. It is intended that the appended claims be constructed to include alternative embodiments to the extent permitted by the prior art.

The invention claimed is:

1. A method of editing information related to a picture file displayed on a cellular telephone, said method comprising the steps of:
   providing an entry program, on said cellular telephone, for entering information associated with a picture file of a plurality of picture files on a display of said cellular telephone;
   displaying said entry program in response to a request to edit information associated with a picture file;
   enabling entry of information comprising a word associated with said picture file of said plurality of picture files by way of said entry program on said cellular telephone;
   storing said plurality of picture files and said word associated with said picture file in a user database associated with a service provider of said cellular telephone;
   providing a website associated with said service provider accessible by a user of said cellular telephone;
   enabling access to said plurality of picture files by a computer at a location remote from said cellular telephone accessing said plurality of picture files stored in said database by way of said website;
   providing an entry program by way of said website for editing said word associated with said picture file on said computer at said location remote from said cellular telephone;
   enabling a user to edit said word associated with said picture file of said plurality of picture files by way of said computer at said location remote from said cellular telephone; and
   providing said edited word to said cellular telephone.

2. The method of claim 1 further comprising a step of providing at least one picture flue of said plurality of picture files to said cellular telephone a way of a wireless link of a telecommunications network.

3. The method of claim 1 further comprising a step of enabling a user to change the order in which said plurality of picture files appear on a display of said computer at said location remote from said cellular telephone.

4. A method of editing information related to a picture file displayed on a cellular telephone, said method comprising the steps of:
   providing an entry program, on said cellular telephone, for entering information associated with a picture file of a plurality of picture flies on a display of said cellular telephone;
   displaying said entry program in response to a request to edit information associated with a picture file;
   enabling entry of information comprising a word associated with said picture file of said plurality of picture files by way of said entry program on said cellular telephone;
   receiving said plurality of picture files from said cellular telephone at a wireless service provider for said cellular telephone;
   storing said plurality of picture files and said word associated with said picture file in a user database associated with a service provider of said cellular telephone;
   providing a website accessible by a user of said cellular telephone;
   enabling a user to access said plurality of picture files stored in said database by a computer from a location remote from said cellular telephone by way of said website;
   providing an entry program on said computer by way of said website for editing said word associated with said picture file at said location remote from said cellular telephone; and
   enabling a user to change the order in which said plurality of picture files are displayed on said computer at said location remote from said cellular telephone by way of said entry program displayed on said computer at said remote location.

5. The method of claim 4 further comprising a step of enabling a user to change the order in which said plurality of picture files displayed on said cellular telephone remote from said cellular telephone.

6. The method of claim 5 further comprising a step of enabling a user to edit information related to each picture file of said plurality of picture files.

7. A method of editing information related to a picture file displayed on a cellular telephone, said method comprising the steps of:
   providing an entry program, on said cellular telephone, for entering information associated with a picture file of a plurality of picture files on a display of said cellular telephone;
   displaying said entry program in response to a request to edit information associated with a picture file;
   enabling entry of information comprising a word associated with said picture file of said plurality of picture files by way of said entry program on said cellular telephone;
   receiving said plurality of picture files from said cellular telephone at a wireless service provider for said cellular telephone;
   storing said plurality of picture files and said word associated with said picture file in a user database associated with said wireless service provider;
   enabling a user to access said plurality of picture files stored in said user database by way of a website of said wireless service provider accessible by a computer separate from said cellular telephone;
   providing an entry program for editing said word associated with said picture file on said computer accessing said plurality of picture files in said user database at a location remote from said cellular telephone;
   enabling the user to said word associated with said picture file stored in said user database and
   providing said edited words to said cellular telephone by way of a wireless link of a telecommunications network.

8. The method of claim 7 further comprising a step of displaying said plurality of picture files on said website of said wireless service provider.

9. The method of claim 8 further comprising a step of enabling a user to change the order in which said plurality of picture files are displayed on said website.

10. The method of claim 9 further comprising a step of providing said order of said plurality of picture files to said cellular telephone.

11. A method of editing information related to a picture file displayed on a cellular telephone, said method comprising the steps of:

providing an entry program, on said cellular telephone, for entering information associated with a picture file of a plurality of picture files on a display of said cellular telephone;

displaying said entry program in response to a request to edit information associated with a picture file;

enabling entry of information comprising a word associated with said picture file of said plurality of picture files by way of said entry program on said cellular telephone, receiving said plurality of picture flies stored on said cellular telephone at a wireless service provider for said cellular telephone;

storing said plurality of picture files and said word associated with said picture file in a user database for said cellular telephone associated with said wireless service provider;

enabling a user to access said plurality of picture files stored in said user database by way of a computer accessing a personal webpage of a user associated with a website of said wireless service provider;

providing an entry program for editing said word associated with said picture file stored in said user database on said personal webpage at a location remote from said cellular telephone; and enabling said user to change the order in which said plurality of picture files are displayed on said personal webpage.

12. The method of claim 11 further comprising a step of providing a selection option with at least one picture file of said plurality of picture files.

13. The method of claim 12 further comprising a step of enabling user to designate said selection option from said personal webpage remote from said cellular telephone.

14. A method of editing information related to a picture file displayed on a cellular telephone, said method comprising the steps of:

providing an entry program, on said cellular telephone, for entering information associated with a picture file of a plurality of picture files on a display of said cellular telephone;

displaying said entry program in response to a request to edit information associated with a picture file;

enabling entry of information comprising a word associated with said picture file of said plurality of picture files by way of said entry program on said cellular telephone;

receiving said plurality of picture files and related information from said cellular telephone at a wireless service provider for said cellular telephone;

storing said plurality of picture files and said word associated with said picture file in a user database associated with said wireless service provider;

enabling a user to access said plurality of picture files by a computer accessing said plurality of picture files stored in said user database by way of a web site of said wireless service provider;

providing an entry program for editing said word associated with said picture file on said website of said wireless service provider;

enabling a user to edit said word associated with said picture file by way of said computer accessing said plurality of picture files stored in said user database by way of said web site; and providing said edited word to said cellular telephone.

15. The method of claim 14 further comprising a step of providing a plurality of selection options with said plurality of picture files.

16. The method of claim 15 further comprising a step of enabling the selection of said plurality of selection options from said web page.

17. The method of claim 14 further comprising a step of enabling a user to change the order in which said plurality of picture files are displayed on said website.

18. The method of claim 14 further comprising a step of enabling a user to enter a keyword associated with a picture file, wherein said keyword is associated with the contents of said picture file.

* * * * *